United States Patent [19]
Shimpuku et al.

[11] Patent Number: 5,432,799
[45] Date of Patent: Jul. 11, 1995

[54] MODULATING METHOD

[75] Inventors: Yoshihide Shimpuku, Kanagawa; Hiroyuki Ino; Yasuyuki Chaki, both of Chiba; Toshiyuki Nakagawa, Kanagawa, all of Japan

[73] Assignee: Sony Corporation, Tokyo, Japan

[21] Appl. No.: 64,764

[22] Filed: May 19, 1993

[30] Foreign Application Priority Data
May 25, 1992 [JP] Japan ................... 4-157558

[51] Int. Cl.6 .................. H03M 7/46; H03M 13/00
[52] U.S. Cl. .................... 371/37.1; 341/51; 341/59; 341/67; 371/28
[58] Field of Search .............. 371/5.1, 5.5, 28, 30, 371/37.1, 41, 52; 341/50, 51, 59, 94, 67; 369/32; 375/21, 25; 360/29

[56] References Cited
U.S. PATENT DOCUMENTS
5,099,237  3/1992  Fitingof .................. 341/59
5,271,016  12/1993 Hilden et al. ............ 371/37.1

Primary Examiner—Ellis B. Ramirez
Assistant Examiner—Edward Pipala
Attorney, Agent, or Firm—Limbach & Limbach

[57] ABSTRACT

A method of modulating digital data to a variable-length code having parameters d, k, m, n, and r for recording information on and reproducing the same from an optical disc. The optimal range of a minimum run length d corresponding to the minimum number of successive same symbols is determined by a procedure which includes a first step to determine the minimum S/N required for obtaining a desired error rate from the relationship between a bit error rate and the S/N when d=0; a second step to obtain the relationship between a change of the numerical value d and that of the S/N by calculating, on the basis of the required minimum S/N obtained at the first step, the S/N loss caused due to the change of the numerical value d; and a third step to determine, from the relationship between the numerical value d and the S/N, the range of the value d corresponding to the S/N of the transmission characteristic dependent on an optical system and an optical disc.

8 Claims, 8 Drawing Sheets

FIG. 3

| d | IMPULSE RESPONSE | 2/(d+2) | S/N |
|---|---|---|---|
| 0 | | 1.0 | 0.0 (dB) |
| 1 | | 2/3 | −3.52 |
| 2 | | 1/2 | −6.02 |
| 3 | | 2/5 | −7.96 |
| 4 | | 1/3 | −9.54 |
| 5 | | 2/7 | −10.9 |
| 6 | | 1/4 | −12.0 |

MODULATING METHOD

BACKGROUND OF THE INVENTION

1. Field of the Invention

The present invention relates to a modulating method adapted for use in digitally recording data on a recording medium and, more particularly, in determining the optimal range of a minimum run length d (minimum number of successive same symbols) in a variable-length code (d, k; m, n; r).

2. Description of the Related Art

In a magnetic recording system for example, generally its signal frequency characteristic is differential, and there occurs deterioration of the characteristic in a higher frequency range of the signal. Such deterioration is derived from, e.g., a variety of losses relative to a head gap, the space between a head and a recording medium, the thickness of a recording medium, and low-frequency loss caused by a rotary transformer. In addition, random errors are induced by crosstalk noise from adjacent tracks, noise from a recording medium, or overwrite noise. For achieving an exact operation of recording and reproducing data despite any of such losses and noises, it is preferred that the digital data is modulated, prior to being recorded on a medium, in a manner to be adequate for the recording system, whereby a greater amount of the information can be recorded with stability. For the purpose of meeting the above requirement, it is generally customary to channel-code the data in accordance with predetermined rules.

A block code is included in such channel code. The block code is used for forming a train of data into blocks each consisting of $m \times i$ bits, and converting the data words into a recording code of $n \times i$ channel bits in accordance with adequate coding rules. When i is equal to 1, it becomes a fixed-length code; whereas when i and the maximum restriction length r are both greater than 1, it becomes a variable-length code. This block code is also termed (d, k; m, n; r) code, where d stands for the minimum number of successive same symbols (e.g., 0's in the case where date is encoded such that a 1 represents a transition, and a 0 represents no transition; thus a 0 in the encoded signal represents the fact that the same symbol in the unencoded form as the previous symbol is written or read); k for the maximum number of successive same symbols (0's in the transition encoded form); m for the length of a basic data word; and n for the length of a basic code word.

In compact discs for example, there is adopted an eight-to-fourteen modulation (EFM) system. In the EFM code where d is 2, its minimum inversion interval Tmin is 1.41, and its detection window width Tw is 0.4.

The recording density in a compact disc can be increased by reducing the lengths of pits on the disc. However, if the pit length is excessively reduced to be smaller than the diameter of a detecting laser beam, there arise difficulties in performing proper detection of the pits. Therefore, in case the pit length is reduced, the wavelength of the detecting laser beam needs to be shorter. As listed in Table 1, the wavelength of a red laser beam is 780 nm, while that of a green laser beam is 532 nm. And if a blue laser is realized, its wavelength is as short as 420 nm. As compared with the reference surface density in a red laser, the surface density attained by the use of a green laser or a blue laser can be increased 2.15 times or 3.0 times.

TABLE 1

|  | Red laser | Green laser | Blue laser |
| --- | --- | --- | --- |
| Wavelength | 780 nm | 532 nm | 420 nm |
| Surface density | 1.0 times | 2.15 times | 3.0 times |
| NA: $0.4 \rightarrow 0.6$ | 2.0 times | 4.3 times | 6.0 times |

In addition, if the numerical aperture NA of an objective lens for focusing a laser beam is increased from a normal value of 0.4 to 0.6 for example, it becomes possible to enhance the surface density 2.0, 4.3 or 6.0 times in comparison with the value at the NA of 0.4 in a red, green or blue laser.

However, for recording video information (moving pictures) at a density of 10 Mbps on a disc equal in diameter (12 cm) to a compact disc, it is necessary to increase the density more than 6 times since the linear density in the conventional compact disc is approximately 1.5 Mbps. And there exist difficulties in realizing such a high density even by the use of a green laser, as is obvious from Table 1.

OBJECT AND SUMMARY OF THE INVENTION

The present invention has been accomplished in view of the circumstances mentioned above. And its object resides in providing an improved modulating method which is capable of achieving a higher recording density.

According to one aspect of the present invention, there is provided a method of modulating digital data to a variable-length code (d, k; m, n; r) for recording information on and reproducing the same from an optical disc. In this method, an optimal range of a minimum run length corresponding to the minimum number of successive same symbols is determined by a procedure which comprises a first step to determine the minimum S/N (signal-to-noise ratio) needed for obtaining a desired error rate from the relationship between a bit error rate and the S/N when $d=0$; a second step to obtain the relationship between a change of the numerical value d and the S/N by calculating, on the basis of the required minimum S/N obtained at the first step, the S/N loss caused due to the change of the numerical value d; and a third step to determine, from the relationship between the numerical value d and the S/N, the range of the value d corresponding to the S/N of the transmission characteristic dependent on an optical system and an optical disc.

The desired error rate at the first step ranges approximately from $10^{-8}$ to $10^{-10}$, and the minimum S/N required for realizing such error rate ranges approximately from 21 to 22 dB, and the S/N of the transmission characteristic dependent on the optical system and the optical disc is $32 \pm 3$ dB.

The S/N loss due to the change of the numerical value d is calculated as follows.

$$S/N \text{ loss} = 20 \log_{10} (2/(d+2))$$

where $d = 0, 1, 2, 3, \ldots$

The above and other features and advantages of the present invention will become apparent from the following description which will be given with reference to the illustrative accompanying drawings.

BRIEF DESCRIPTION OF THE DRAWINGS

FIG. 3 is an explanatory diagram showing the relationship between a minimum run length d (minimum number of successive same symbols) and an impulse response;

DESCRIPTION OF THE PREFERRED EMBODIMENT

Figure 1:
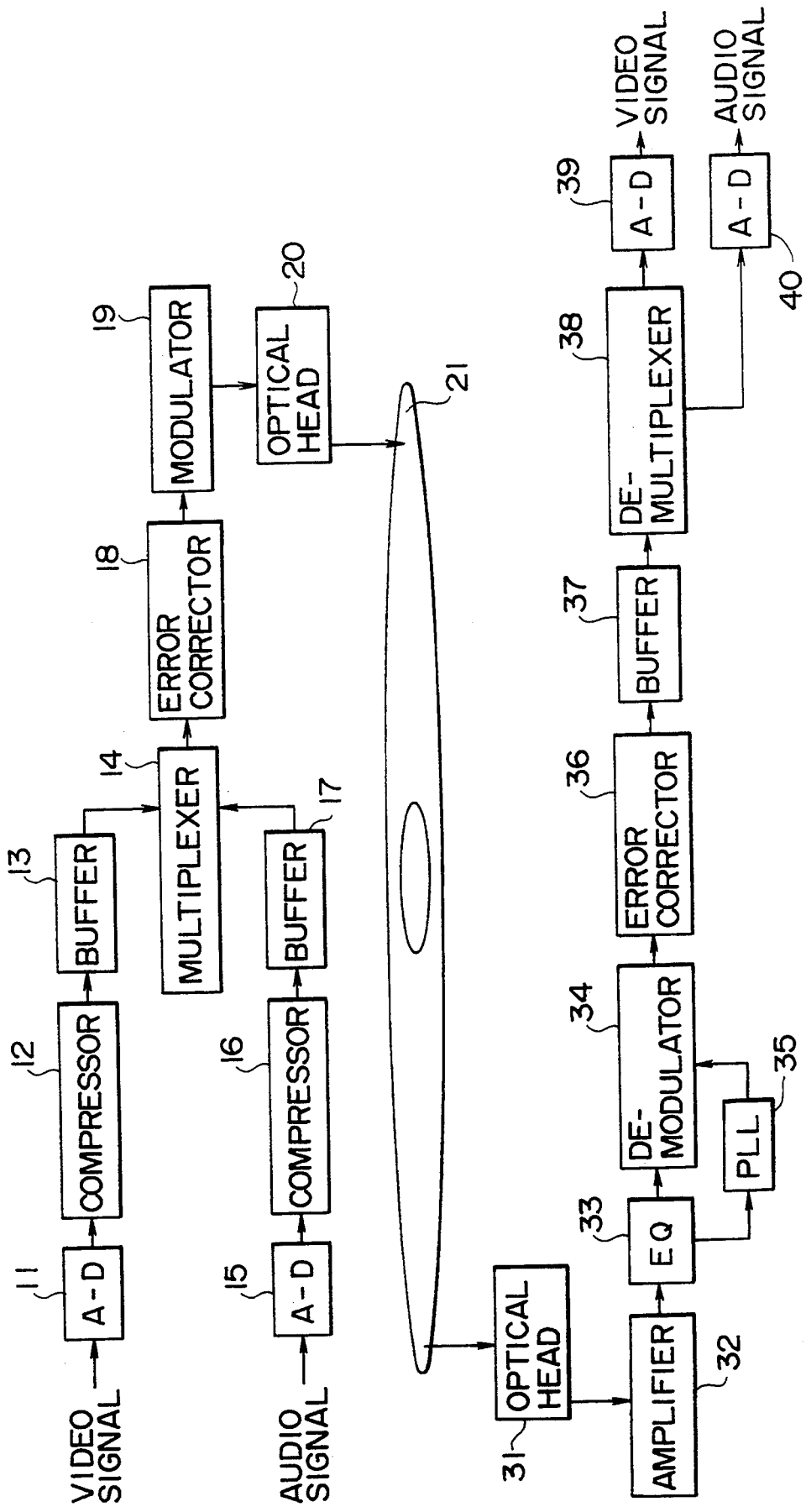
FIG. 1 is a block diagram showing an exemplary constitution of an optical disc apparatus to which the modulating method of the present invention is applied.

FIG. 1 is a block diagram showing an exemplary constitution of an optical disc apparatus to which the code generated by the modulating method of the present invention is applied. As shown in this diagram, a video signal is input to an A-D converter 11 where analog-to-digital conversion is executed, and the converted signal is supplied to a compressor 12 so as to be compressed. The output of the compressor 12 is supplied via a buffer 13 to a multiplexer 14. Similarly, an audio signal is input to an A-D converter 15 where analog-to-digital conversion is executed, and then the analog-converted signal is supplied to a compressor 16 so as to be compressed. And the output of the compressor 16 is supplied via a buffer 17 to the multiplexer 14. The outputs of the buffers 13 and 17 are combined with each other in the multiplexer 14, whose output is then supplied to an error corrector 18. The error corrector 18 adds an error detection code and an error correction code to its input data, and its output is supplied to a modulator 19. In the modulator 19, the data received from the error corrector 18 is digitally modulated in accordance with a predetermined conversion format which will be described later. And the modulated signal is outputted to an optical head 20. Then the optical head 20 generates a laser beam in conformity with the output of the modulator 19, and a signal is recorded on an optical disc 21.

An optical head 31 irradiates a laser beam to the optical disc 21 and reproduces, from the reflected light, the signal recorded on the optical disc 21. The reproduced signal outputted from the optical head 31 is supplied via an amplifier 32 to an equalizer (EQ) 33 so as to be equalized to predetermined frequency characteristic. The output of the equalizer 33 is supplied to a demodulator 34 while being supplied also to a PLL circuit 35, which extracts a clock signal synchronized with the clock component included in its input signal and supplies the clock signal to the demodulator 34. And the output of the demodulator 34 is supplied to an error corrector 36, which then corrects the errors in the data received from the demodulator 34 and supplies the corrected data via a buffer 37 to a demultiplexer 38. In the demultiplexer 38, the video data and the audio data are separated from the output data of the buffer 37 and then are supplied to A-D converters 39 and 40 respectively.

Now the operation of the above apparatus will be described below. After the analog-to-digital conversion of the video signal in the A-D converter 11, the signal is compressed in the compressor 12. Similarly the audio signal processed through the analog-to-digital conversion in the A-D converter 15 is compressed in the compressor 16. The buffers 13 and 17 control the timing of the video signal and that of the audio signal respectively and supply the outputs thereof to the multiplexer 14, where the video signal and the audio signal received via the buffers 13 and 17 are combined with each other and then are supplied to the error corrector 18. Subsequently in the error corrector 18, error detection and correction codes are added to the input data received from the multiplexer 14, and the composite signal thus obtained is supplied to the modulator 19, which converts the input digital data to a recording code in accordance with a predetermined conversion format. And the recording code is supplied to the optical head 20 so as to be used for modulation of the laser beam. Consequently the modulated laser beam corresponding to the recording code is irradiated onto the optical disc 21 to thereby form bits which correspond to the recording code.

The optical head 31 reproduces the code recorded on the optical disc 21 and supplies the reproduced output to the amplifier 32, where the output of the optical head 31 is amplified and then is supplied to the equalizer 33. Thereafter the equalizer 33 equalizes the input reproduced signal and supplies the same to the demodulator 34. Meanwhile the PLL circuit 35 extracts the clock component from the output of the equalizer 33 and supplies the clock signal to the demodulator 34. Subsequently in the demodulator 34, the recording code supplied from the equalizer 33 is demodulated to the former digital data on the basis of the clock signal obtained from the PLL circuit 35. The demodulated output is then supplied to the error corrector 36 where the error is corrected. Thereafter the output of the error corrector 36 is supplied via the buffer 37 to the demultiplexer 38 so as to be separated into the video data and the audio data. The audio data is supplied to the A-D converter 39 for analog-to-digital conversion, while the video data is supplied to the A-D converter 40 for the same conversion. The video signal and the audio signal outputted from the A-D converters 39 and 40 respectively are supplied to an unshown monitor.

Hereinafter a description will be given on the modulating method adopted in the modulator 19.

Figure 2:
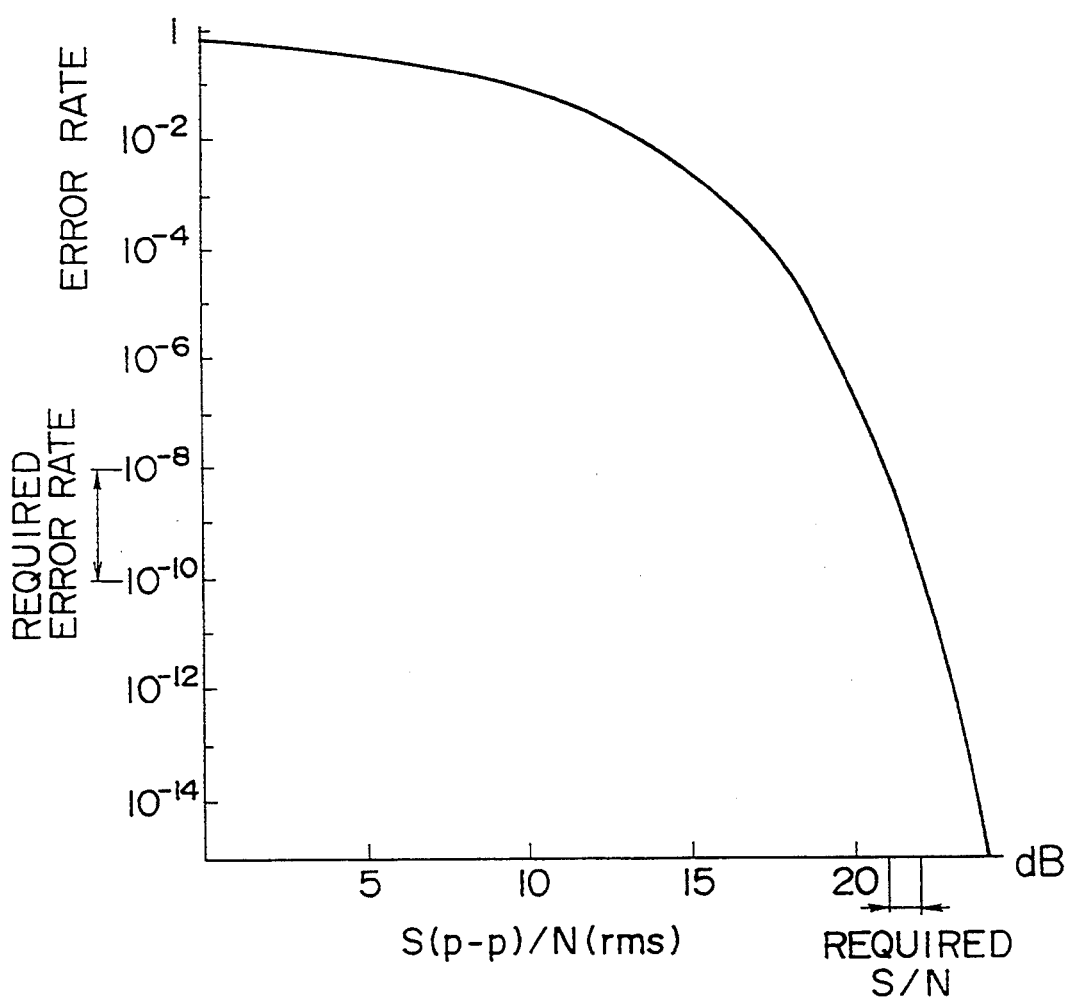
FIG. 2 graphically shows the relationship between an error rate and an S/N.

FIG. 2 graphically shows the relationship between the bit error rate and the S(p-p)/N(rms) (Signal peak-to-peak divided by Noise root-mean-square) in the case where the digital data is modulated by the predetermined method with $d=0$ (inclusive of nonmodulation) and is demodulated. If $d=0$, this relationship remains unchanged regardless of any modulating method. In the graph of FIG. 2, the S/N and the error rate are taken along the abscissa and the ordinate, respectively. It is obvious from this graph that the error rate is lowered in conformity with an increase of the S/N, and also that the magnitude of the logarithm base 10 of the error rate change of the error rate is raised in conformity with an increase of the S/N measured in dB. In the recording-/reproducing system of FIG. 1 where the error rate generally needs to be maintained below $10^{-6}$, it is necessary to suppress the maximum error rate in a range of $10^{-8}$ to $10^{-10}$. For realizing such desired error rate, the S/N needs to be approximately 21 dB to 22 dB, as will be understood from FIG. 2.

The transmission characteristic in the optical recording shown in FIG. 1 is lowered substantially linearly toward the optical cutoff frequency (NA/λ) on the spatial frequency axis determined by a light source in each of a recording section and a reproducing section. FIG. 3 shows a model of such characteristic. When the minimum run length d is changed from 0 to 1, 2, 3, ... and so forth, there is obtained such an impulse response as shown in FIG. 3, where a greater impulse response is obtained with an increase of the numerical value d. More specifically, FIG. 3 shows that the number of symbols "0" interposed between symbols "1" and "1" in the transition encoded signal form is increased with an increase of the numerical value d, and (d+2) channel clock pulses T occur during in the impulse response.

In FIG. 3 showing the impulse response, the abscissa and the ordinate represent the time and the response output, respectively.

In FIG. 3, the S/N required for the (d, k) code is shown on the basis of d=0 as a reference (0 dB). Namely, with an increase of the numerical value d, the S/N is changed to be 2/(d+2) times the ratio at d=0. This relationship is concerned with the case where the recording density is increased by Tmin times the modulation code.

Relative to the numerical value d, the S/N loss L (dB) is expressed as $$L = 20 \log_{10}(2/(d+2))$$

Figure 4:
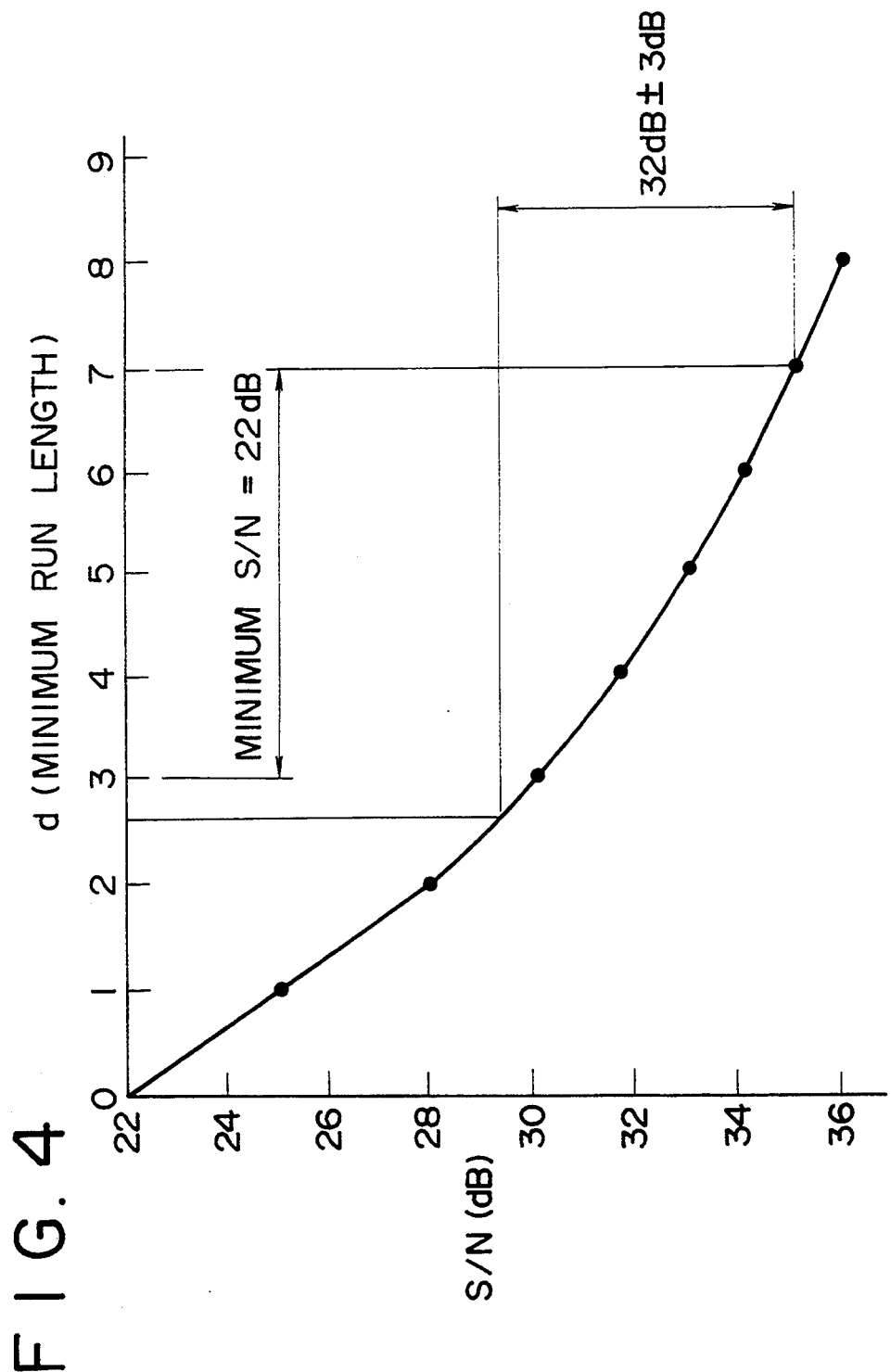
FIG. 4 graphically shows the relationship between the S/N and the minimum run length d.

Suppose now that the above-described S/N of 22 dB is obtained at d=0 (during nonmodulation). Then the S/N is changed as graphically shown in FIG. 4 in accordance with changes of the value d during modulation. It is obvious from this graph that the S/N is raised nearly exponentially in accordance with an increase of the value d and also that a higher S/N for the transmission characteristics of the read and write heads is needed correspondingly to this greater S/N ratio. When d=2 for example, the S/N of the transmission characteristics of the read and write heads needs to be enhanced by 6 dB or so as compared with the ratio at d=0, or the same error rate at will not be attained.

Assume here that the S/N of the transmission characteristic determined by the optical system (optical heads 20 and 31 in FIG. 1) and the optical disc 21 in FIG. 1 is 32±3 dB. Then the numerical value d for ensuring the S/N of 32±3 dB is in a range of 2.5 to 7 as apparent from FIG. 4. More specifically, it is defined that the requirement can be satisfied by setting the minimum run length to a value equal to or greater than 3 and smaller than 7.

Figure 5:
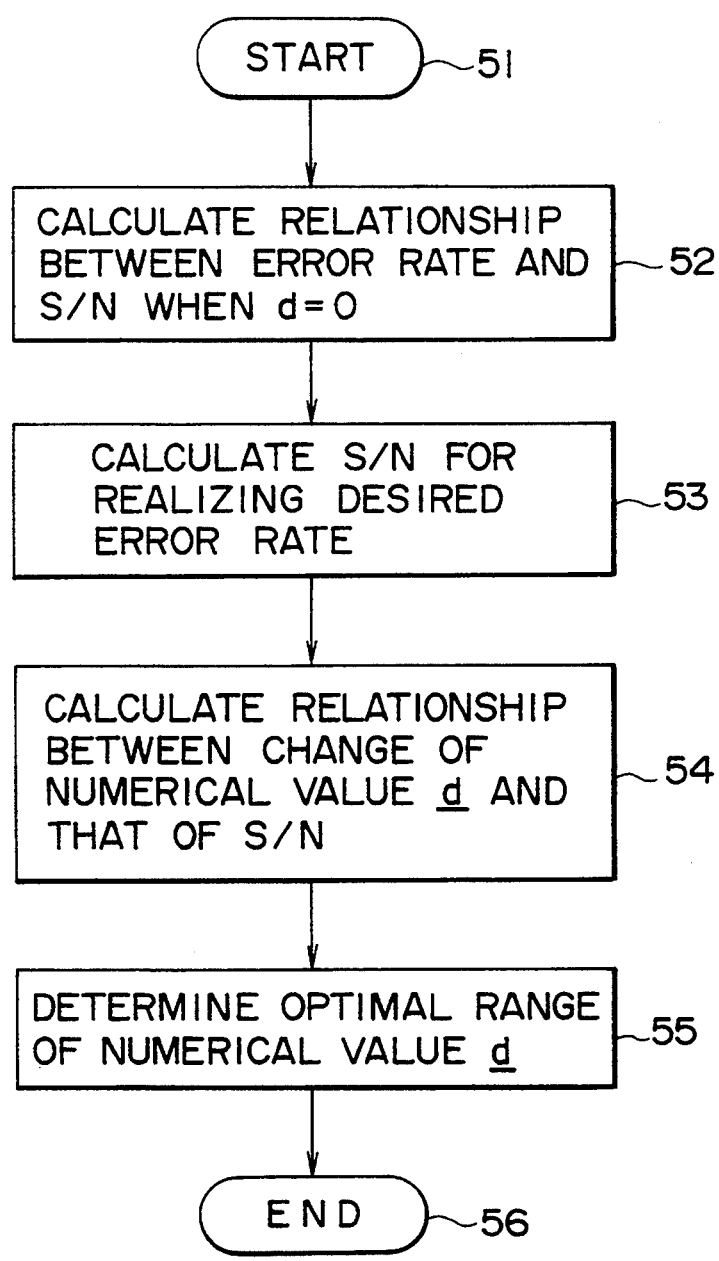
FIG. 5 is a flowchart of a routine for deciding an optimal range of the minimum run length d.

The procedure described above is represented by a flowchart of FIG. 5.

In this chart, a routine for deciding the optimal range of the minimum run length d (minimum number of successive same symbols) by the modulating method of the present invention is started at step 51.

At step 52, there is calculated the relationship between the S/N and the bit error rate in the digital data demodulated after the modulation by the predetermined method to satisfy the condition of d=0. This relationship is such as shown graphically in FIG. 2. Next at step 53, there is calculated the S/N for realizing a desired error rate. For example, in the optical system where the maximum error rate needs to be within a range of $10^{-8}$ to $10^{-10}$, such error rate can be realized by setting the S/N approximately to 21 to 22 dB, as obvious from FIG. 2.

Subsequently at step 54, the relationship between the change of the numerical value d and that of the S/N is calculated. More specifically, there is formed the S/N loss caused in comparison with the S/N at d=0 when the value d is changed from 0 to 1, 2, 3, ... and so forth. And further the relationship between the value d and the S/N is calculated on the basis of the S/N (e.g., 22 dB) obtained at step 53. (FIG. 4) Then at step 55, the optimal range of the value d is determined on the basis of the relationship between the value d and the S/N obtained at step 54. More specifically, there is determined the range of the value d required for ensuring the S/N (32±3 dB) of the transmission characteristic dependent on the system and the data recording medium (e.g., the optical heads and the optical disc).

In the code actually generated under the condition of $3 \leq d \leq 7$, adequate ranges of the minimum inversion interval Tmin (=(m/n)×(d+1) T) and the detection window width Tw (=m/n×T) are as follows.

1.7 T < Tmin < 2.5 T 0.32 T < Tw < 0.45 T

Table 2 shows the intervals Tw and the widths Tmin obtained with changes of the numerical value d to 3, 4, 5 and 6. If the value d is set in a range of 3 to 6, an enhancement of 30% to 75% or more is expectable in the recording density. When d=4 for example, it is possible to realize the recording densities shown in Table 3.

TABLE 2

|  | Tw | Tmin | m/n |
| --- | --- | --- | --- |
| d = 3 | 0.44 | 1.78 | 4/9 |
| d = 4 | 0.4 | 2.0 | 2/5 |
| d = 5 | 0.36 | 2.18 | 4/11 |
| d = 6 | 0.33 | 2.33 | 2/6 |

TABLE 3

|  | Red laser | Green laser | Blue laser |
| --- | --- | --- | --- |
| Wavelength | 789 nm | 532 nm | 420 nm |
| Surface density | 1.0 times | 3.0 times | 4.2 times |
| NA: 0.4 → 0.6 | 2.8 times | 6.0 times | 8.4 times |

As compared with a red laser having a wavelength of 789 nm selected as a reference here, the surface density is increased 3.0 times in the use of a green laser having a wavelength of 532 nm, or 4.2 times in the use of a blue laser having a wavelength of 420 nm. When the numerical aperture NA is changed from 0.4 to 0.6, the capacity can be increased 2.8 times in using the red laser, 6.0 times in using the green laser, or 8.4 times in using the blue laser. Thus, even in using the green laser, it becomes possible to record video information (moving pictures) at 10 Mbps on and to reproduce the same from an optical disc of about 12 cm in diameter.

Now an exemplary variable-length code with d=4 will be described below.

In this embodiment, a data word having a 2-bit basic data length is converted to a code word having a 5-bit basic code length. Table 4 shows six kinds of basic codes used for such conversion. Digital data can be converted to variable-length code words by combining such six kinds of basic codes.

TABLE 4

| 1 | 1 | 0 | 0 | 0 | 0 |
|---|---|---|---|---|---|
| 2 | 0 | 1 | 0 | 0 | 0 |
| 3 | 0 | 0 | 1 | 0 | 0 |
| 4 | 0 | 0 | 0 | 1 | 0 |
| 5 | 0 | 0 | 0 | 0 | 1 |
| 6 | 0 | 0 | 0 | 0 | 0 |

Table 5 shows the number of effective codes obtained by the use of such basic codes. As shown, the number N of required code words is changed from 4 to 8, 16, 28, 32 in accordance with sequential increase of the restriction length r from 1 to 2, 3, 4, 5, while the number M of code words actually adoptable is changed from 2 to 4, 8, 20, 34. Consequently the difference D (=N−M) is changed from 2 to 4, 7, 8, −2. Thus, it becomes possible, by using the code words where the restriction length r is changeable up to 5, to convert the original data into code words properly without any excess or deficiency.

TABLE 5

| Basic code | r | N | M | D |
|---|---|---|---|---|
| (2, 5) | 1 | 4 | 2 | 2 |
| (2, 5) | 2 | 8 | 4 | 4 |
| (2, 5) | 3 | 16 | 9 | 7 |
| (2, 5) | 4 | 28 | 20 | 8 |
| (2, 5) | 5 | 32 | 34 | −2 |

Tables 6-1 and 6-2 are specific examples for converting the digital data to code words by using the basic codes in Table 4. As shown in Tables 6-1 and 6-2 digital data of a 2-bit basic data length is converted to a code word of a 5-bit basic code length. For example, data "11" is converted to a code "00000" and data "10" to a code "10000". Similarly, data of 4-, 6-, 8- and 10-bit lengths are converted respectively to code words having 10-, 15-, 20- and 25-bit code lengths.

TABLE 6-1

| | Data | Code |
|---|---|---|
| r = 1 | 11 | 00000 |
| | 10 | 10000 |
| | 111111 = | 00001 00001 00000 |
| r = 2 | 0111 | 01000 00000 |
| | 0110 | 00100 00000 |
| | 0101 | 00010 00000 |
| | 0100 | 00001 00000 |
| r = 3 | 001111 | 01000 01000 00000 |
| | 001110 | 01000 00100 00000 |
| | 001101 | 01000 00010 00000 |
| | 001100 | 01000 00001 00000 |
| | 001011 | 00010 00001 00000 |
| | 001010 | 00100 00100 00000 |
| | 001001 | 00100 00010 00000 |
| | 001000 | 00100 00001 00000 |
| | 000111 | 00010 00010 00000 |
| r = 4 | 00011011 | 01000 01000 01000 00000 |
| | 00011010 | 01000 01000 00100 00000 |
| | 00011001 | 01000 01000 00010 00000 |
| | 00011000 | 01000 01000 00001 00000 |
| | 00010111 | 01000 00010 00001 00000 |
| | 00010110 | 01000 00100 00100 00000 |
| | 00010101 | 01000 00100 00010 00000 |
| | 00010100 | 01000 00100 00001 00000 |
| | 00010011 | 01000 00010 00010 00000 |
| | 00010010 | 00100 00100 00100 00000 |
| | 00010001 | 00100 00100 00010 00000 |
| | 00010000 | 00100 00100 00001 00000 |
| | 00001111 | 00010 00001 00001 00000 |
| | 00001110 | 00100 00001 00001 00000 |

TABLE 6-1-continued

| | Data | Code |
|---|---|---|
| | 00001101 | 00100 00010 00010 00000 |
| | 00001100 | 00100 00010 00001 00000 |
| | 00001011 | 01000 00001 00001 00000 |
| | 00001010 | 00001 00001 00001 00000 |
| | 00001001 | 00010 00010 00010 00000 |
| | 00001000 | 00010 00010 00001 00000 |
| r = 5 | 0000011111 | 01000 01000 01000 01000 00000 |
| | 0000011110 | 01000 01000 01000 00100 00000 |
| | 0000011101 | 01000 01000 01000 00010 00000 |
| | 0000011100 | 01000 01000 01000 00001 00000 |
| | 0000011011 | 01000 01000 00010 00001 00000 |
| | 0000011010 | 01000 01000 00100 00100 00000 |
| | 0000011001 | 01000 01000 00100 00010 00000 |
| | 0000011000 | 01000 01000 00100 00001 00000 |

TABLE 6-2

| | | |
|---|---|---|
| r = 5 | 0000010111 | 01000 01000 00010 00010 00000 |
| | 0000010110 | 01000 00100 00100 00100 00000 |
| | 0000010101 | 01000 00100 00100 00010 00000 |
| | 0000010100 | 01000 00100 00100 00001 00000 |
| | 0000010011 | 01000 00010 00001 00001 00000 |
| | 0000010010 | 01000 00100 00001 00001 00000 |
| | 0000010001 | 01000 00100 00010 00010 00000 |
| | 0000010000 | 01000 00100 00010 00001 00000 |
| | 0000001111 | 01000 01000 00001 00001 00000 |
| | 0000001110 | 01000 00001 00001 00001 00000 |
| | 0000001101 | 01000 00010 00010 00010 00000 |
| | 0000001100 | 01000 00010 00010 00001 00000 |
| | 0000001011 | 00100 00100 00010 00010 00000 |
| | 0000001010 | 00100 00100 00100 00100 00000 |
| | 0000001001 | 00100 00100 00100 00010 00000 |
| | 0000001000 | 00100 00100 00100 00001 00000 |
| | 0000000111 | 00100 00100 00010 00001 00000 |
| | 0000000110 | 00100 00100 00001 00001 00000 |
| | 0000000101 | 00100 00010 00010 00010 00000 |
| | 0000000100 | 00100 00010 00010 00001 00000 |
| | 0000000011 | 00100 00001 00001 00001 00000 |
| | 0000000010 | 00010 00010 00001 00001 00000 |
| | 0000000001 | 00010 00010 00010 00010 00000 |
| | 0000000000 | 00010 00010 00010 00001 00000 |
| | | 00010 00001 00001 00001 00000 |
| | | 00001 00001 00001 00001 00000 |
| | SYNC for mod2to4d5 | |
| | ASYNC | 23T 21T 6T |
| | BSYNC | 21T 23T 6T |

When the digital data is "11" as shown in Table 6, its corresponding code word is "00000". Accordingly, when 1's are successive as symbols of the digital data in case no particular rule is prescribed, it follows that symbols 0's are successive in the code word. In this case, the code word becomes (4, ∞; 2, 5; 5), and the number N of the code words obtained with changes of the restriction length r is changed as shown in Table 7. However, if the symbols 0's are successive indefinitely, it is rendered difficult to detect an encoded signal. In this embodiment, therefore, when symbols 1's of the digital data are successive in 6 bits, the code is converted to "000010000100000".

TABLE 7

| Basic code | r | N | M | D |
|---|---|---|---|---|
| (2, 5) | 1 | 4 | 2 | 2 |
| (2, 5) | 2 | 8 | 4 | 4 |
| (2, 5) | 3 | 16 | 10 | 6 |
| (2, 5) | 4 | 24 | 20 | 4 |
| (2, 5) | 5 | 16 | 35 | −19 |

Relative to the 4Z code in Table 8, there are shown the minimum inversion interval Tmin (=(m/n)(d+1)T), the maximum inversion interval Tmax (=(m/n)(k+1)T), the data detection window width Tw (=(m/n)T), the product of Tmin and Tw, and the Tmax-to-Tmin ratio of the code word shown in Table 6, where T denotes the interval between the digital data. In addition to the above, Table 8 also shows the values in the 3Z code (d=3) and those in the EFM code. As obvious from the comparison with such values, the minimum inversion interval Tmin in this embodiment is 2.0 T which is greater than that in the 3Z and EFM codes.

TABLE 8

| Code | Tmin | Tmax | TW | Tmin*Tw | Tmax/Tmin |
|------|------|------|------|---------|-----------|
| EFM  | 1.41T | 5.18T | 0.47T | 0.663 | 3.7 |
| 3Z   | 1.78T | 7.11T | 0.44T | 0.78  | 4 |
| 4Z   | 2.0T  | 9.2T  | 0.4T  | 0.8   | 4.6 |

Figure 6:
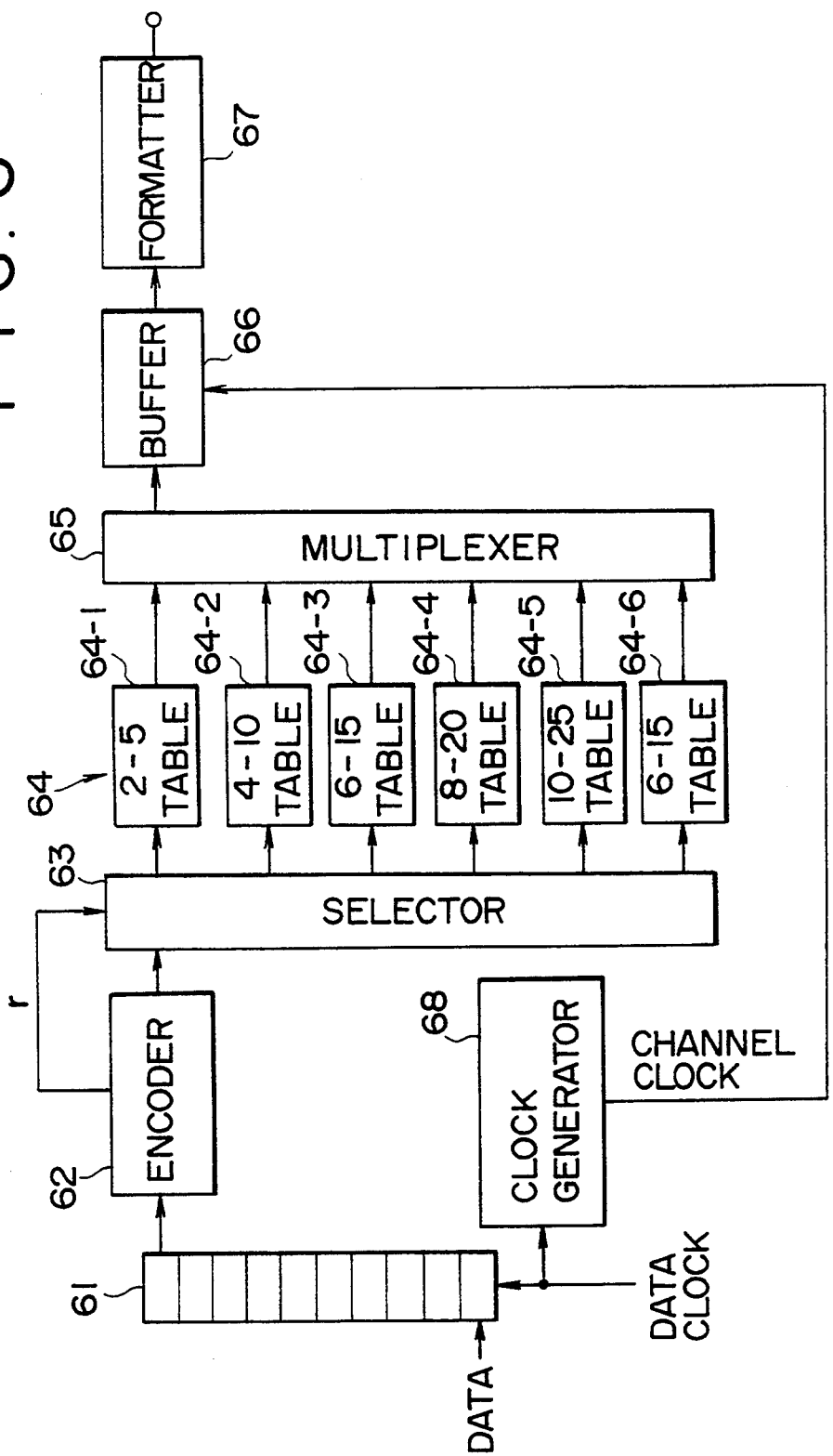
FIG. 6 is a block diagram of an exemplary modulator employed in the apparatus of FIG. 1.

FIG. 6 is a block diagram showing an exemplary constitution of the modulator 19 employed in the apparatus of FIG. 1. Digital data is sequentially inputted to a shift register 61 in synchronism with data clock pulses. In this embodiment, 10-bit digital data is stored in the shift register 61. The data outputted from the shift register 61 is supplied to an encoder 62, where the restriction length r is decided. The digital data supplied from the shift register 61 is delivered via the encoder 62 to a selector 63.

The selector 63 is so formed that the digital data received from the shift register 61 via the encoder 62 is supplied to one of ROMs 64-1–64-6 in conformity with the result of the decision obtained from the encoder 62 relative to the restriction length r. In the ROM 64-1, there is stored a table for conversion of 2-bit data (shown in Table 6) to a 5-bit code. Similarly in the ROMs 64-2–64-5, tables are stored for conversion of 4-, 6-, 8- and 10-bit digital data respectively to code words of 10-, 15-, 20- and 25-bit code lengths. And in the ROM 64-6, a conversion table is stored to be used when the symbols of the input digital data are 1's in successive 6 bits.

A multiplexer 65 combines the outputs of the ROMs 64-1–64-6 with one another and delivers the same to a buffer 66. The data read out from the buffer 66 is supplied to a formatter 67. A clock generator 68 generates a channel clock signal synchronized with the data clock signal and supplies the output signal to the buffer 66.

Hereinafter the operation of the above modulator 19 will be described. The encoder 62 decides the restriction length r of the 10-bit data stored in the shift register 61. And the selector 63 is controlled in accordance with the result of such decision, whereby the input digital data is supplied to one of the ROMs 64-1–64-6. In case the result of the decision signifies that the restriction length r is 1, the 2-bit data is supplied to the ROM 64-1. This data is "11" or "10". The digital data "11" is converted to a code "00000" in accordance with the table stored in the ROM 64-1, while the digital data "10" is converted to a code "10000".

When the input digital data is "0111" for example, the restriction length r is decided to be 2, and the data is supplied to the ROM 64-2. Then the data is converted to a code "0100000000" in accordance with the table stored therein.

Thereafter the digital data shown in Tables 6-1 and 6-2 are converted respectively to corresponding codes by the procedure similar to the above.

FIGS. 7(a)–7(c) show an example of such conversion. Suppose now that the input digital data is 18D2 (FIG. 7(a)) in hexadecimal notation. Then its binary data (FIG. 7(b)) is "0001100011010010". The encoder 2 decides the restriction length r of the input binary data as follows. The data corresponding to the first 2 bits "00" is not existent in Table 6. Therefore a decision is made as to whether the 4-bit data "0001" inclusive of the succeeding 2-bit data is existent in Table 6. However, this data is not existent either in Table 6.

Subsequently another decision is made as to whether 6-bit data "000110" inclusive of another 2 bits is existent or not in Table 6. Since this data is not existent either in Table 6, further 2-bit data is added thereto. The 8-bit data "00011000" thus obtained is existent in the contents of Table 6 where the restriction length r=4, so that the length is decided as r=4. Then the selector 3 delivers the data "00011000" to the ROM 64-4. This digital data is converted to a code word "0100001000000100000" in accordance with the table stored in the ROM 64-4 (FIG. 7(c)).

Since the next 2-bit data "11" is decided to be the data of a restriction length r=1 shown in Table 6, it is supplied to the ROM 64-1 and is converted to a code word "00000" (FIG. 7(c)).

The following 2-bit data "01" is not existent in the contents of Table 6, so that the next 2-bit data is added thereto. The data "0100" thus obtained is detected as the data of a restriction length r=2 in Table 6, and then is supplied to the ROM 64-2. And subsequently it is converted to a code word "0000100000" (FIG. 7(c)).

Figure 7:
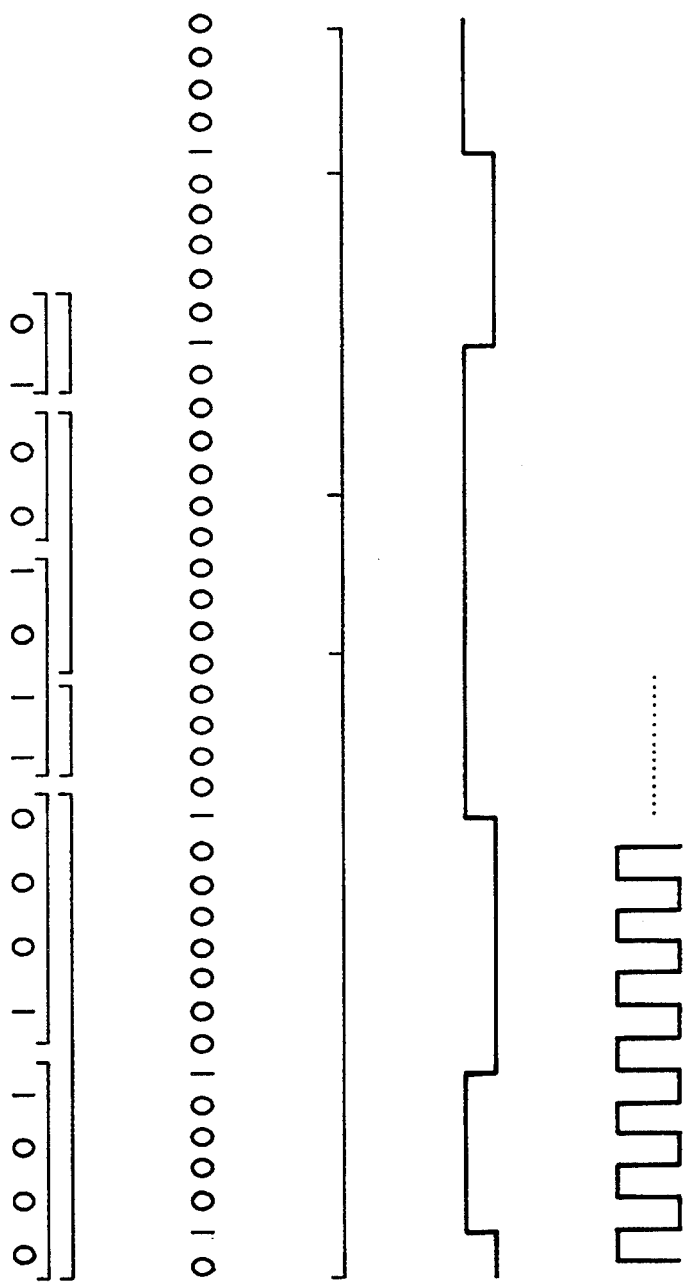
FIGS. 7A–7F are timing charts of signals for explaining the operation in FIG. 5.

As the succeeding data "10" is detected as the data of a restriction length r=1, it is supplied to the ROM 64-1 and is converted to a code word "1000" (FIG. 7 (c)).

The code words thus converted through the ROMs 64-1–64-6 are supplied to the multiplexer 5 and are mutually combined to form a code word of successive bits. As mentioned, delimiters of this code word are positioned at the first 20 bits, the next 5 bits, the following 10 bits and the 5 bits posterior thereto (FIG. 7(d)).

The composite code word combined by the multiplexer 65 is supplied to the buffer 66 in synchronism with the channel clock signal (FIG. 7(f)) and is stored therein. Subsequently the code word is read out and supplied to the formatter 67, where a sync signal is added to the code word supplied from the buffer 66 to thereby form a code conforming with a predetermined format. The code thus obtained is then outputted to the optical head 20, whereby there is produced a recording signal (FIG. 7(e)) whose level is inverted in response to each generation of a symbol 1. Such signal is recorded on the optical disc 21.

Figure 8:
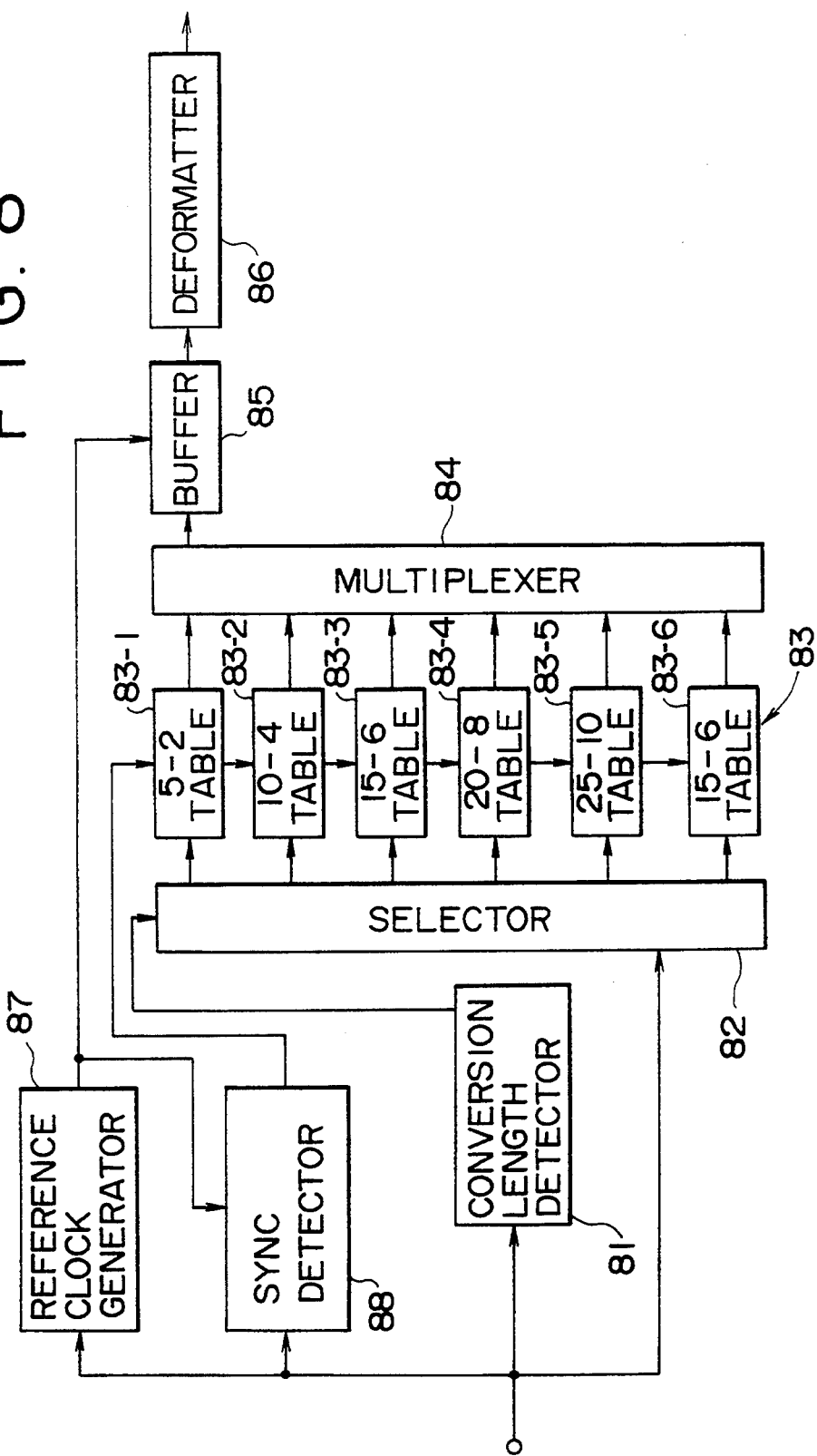
FIG. 8 is a block diagram of an exemplary demodulator employed in the apparatus of FIG. 1.

FIG. 8 is a block diagram showing an exemplary constitution of the demodulator 34 employed in the apparatus of FIG. 1. The code word reproduced from the optical disc 21 in FIG. 1 is supplied to a selector 82. A conversion length detector 81 detects the conversion length of the code word to control the selector 82. Then the selector 82 delivers the input code word to one of ROMs 83-1–83-6, which constitute a ROM 83, in accordance with the output of the conversion length detector 81. The contents inverse to those of Tables 6-1 and 6-2 are stored in the ROMs 83-1–83-6. More specifically, there are stored conversion tables for decoding the code words, which are shown in Tables 6-1 and 6-2 to regain the original digital data.

A multiplexer 84 combines the data read out from the ROMs 83-1–83-6 and delivers the composite data to a buffer 85. Subsequently the data read out from the buffer 85 is supplied to a deformatter 86, and the deformatted data therefrom is supplied to an error corrector 86.

A reference clock generator 87 generates a reference clock signal synchronized with the input code word and supplies the clock signal to both the buffer 85 and a sync detector 88. Then the sync detector 88 detects the sync signal position of the code word on the basis of the reference clock signal supplied thereto from the reference clock generator 87. And the detected signal is supplied to the ROM 83.

Now the operation of the demodulator 34 in FIG. 1 will be described below. The conversion length detector 81 detects the conversion length of the input code word and controls the selector 82 in conformity with the result of such detection, whereby the code word having a 5-bit basic code length is supplied to the ROM 83-1, while the code word having a 10-bit basic code length is supplied to the ROM 83-2. Similarly, the code words having 15-bit, 20-bit and 25-bit basic code lengths individually are supplied to the ROMs 83-3–83-5 respectively. When the input code word has a 15-bit length as "000010000100000" it is supplied to the ROM 83-6.

The code words inputted to the ROMs 83-1–83-6 are decoded to become the original data in accordance with the tables stored therein respectively. The digital data decoded by means of the ROMs 83-1–83-6 are combined with one another by the multiplexer 84, and the composite data is written in the buffer 85. Subsequently the data read out from the buffer 85 is supplied to the deformatter 86 and, after the process of separating the sync signal and so forth, the data is supplied to the error corrector 36 in FIG. 1.

It is to be understood that the present invention is applicable to a variety of recording media including magneto-optical disc, optical disc, magnetic disc and magnetic tape.

What is claimed is:

1. A method of digitally recording data on a recording medium at a high recording density, comprising:
inputting a sequence of digital data to be recorded on the recording medium to a data modulation means;
modulating the digital data using the modulation means to convert the data to a variable-length code having parameters d, k, m, n, and r, wherein m is the number of bits in a basic data word, n is the number of bits in a basic code word, d is the minimum number of successive same symbols in the code, k is the maximum number of successive same symbols in the code, and r is a maximum restriction length, wherein the modulation step includes the steps of:
determining a value for the maximum restriction length r for the input data;
determining a value for the minimum number of successive same symbols (d) in the code, wherein the value of d is determined by the steps of:
determining a minimum signal-to-noise ratio (S/N) required to obtain a desired error rate from a relationship between a bit error rate and a signal to noise ratio (S/N);
determining a relationship between a change in the numerical value of d and a resulting change in the S/N ratio;
determining a range of the value of d corresponding to a S/N ratio of a recording circuit used to record the data on the recording medium from the relationship between the numerical value d and the resulting change in the S/N ratio; and
selecting a value of d in that range; and converting the sequence of digital
data into a code word based on the determined values of the maximum restriction length r and the minimum number of successive same symbols d; and
recording the coded digital data on the recording medium.

2. The data recording method of claim 1, wherein the relationship between the bit error rate and the S/N ratio is the relationship obtained when d is equal to 0.

3. The data recording method of claim 2, wherein the relationship between a change in the numerical value d and the S/N ratio is determined on the basis of the required minimum S/N and the S/N loss caused with an increase in the value of d.

4. The data recording method of claim 3, wherein the S/N loss is computed according to:

$$S/N \text{ loss} = 20 \log_{10}(2/(d=2)),$$

where $d = 0, 1, 2, 3, \ldots$.

5. The data recording method of claim 2, wherein the desired error rate ranges from about $10^{-8}$ to about $10^{-10}$, and the minimum S/N ratio required for such error rate ranges from about 21 to about 22 dB.

6. The data recording method of claim 1, wherein the value of d in the variable-length code ranges from 3 to 7, a minimum inversion interval Tmin ranges from about 1.7 T to about 2.5 T, where T is a time interval between bits, and a detection window width Tw ranges from about 0.32 T to about 0.45 T.

7. A method of digitally recording data on a recording medium at a high recording density, comprising:
inputting a sequence of digital data to be recorded on the recording medium to a data modulation means;
modulating the digital data using the modulation means to convert the data to a variable-length code having parameters d, k, m, n, and r, wherein m is the number of bits in a basic data word, n is the number of bits in a basic code word, d is the minimum number of successive same symbols in the code, k is the maximum number of successive same symbols in the code, and r is a maximum restriction length, wherein the modulation step includes the steps of:
determining a value for the maximum restriction length r for the input data;
determining a value for the minimum number of successive same symbols (d) in the code, wherein the value of d is determined by the steps of:
determining a minimum signal-to-noise ratio (S/N) required to obtain a desired error rate from a relationship between a bit error rate and the S/N at $d=0$;
determining a relationship between a change in the numerical value d and the S/N ratio from the required minimum S/N ratio by determining the S/N loss caused with the change in the numerical value d, wherein the S/N loss is found according to $$S/N \text{ loss} = 20 \log_{10}(2/(d=2)),$$

where $d = 0, 1, 2, 3, \ldots$ ;

determining a range of the value of d corresponding to the S/N ratio of the transmission characteristics of a recording system used to record the data on the recording medium from the relationship between the numerical value d and the S/N ratio; and selecting a value of d in that range; and converting the sequence of digital data to a code word based on the determined values of the maximum restriction length r and the minimum number of successive same symbols d; and recording the coded digital data on the recording medium.

8. The data recording method of claim 7, wherein the desired error rate ranges from about $10^{-8}$ to about $10^{-10}$, the minimum S/N ratio required for realizing such error rate ranges from about 21 to about 22 dB, and the S/N ratio of the transmission characteristic dependent on the recording system and the recording medium is approximately $32 \pm 3$ dB.

* * * * *